United States Patent
Ballester-Merelo et al.

(10) Patent No.: US 7,821,393 B2
(45) Date of Patent: Oct. 26, 2010

(54) MULTIVARIATE ENVIRONMENTAL SENSING SYSTEM WITH INTELLIGENT STORAGE AND REDUNDANT TRANSMISSION PATHWAYS

(75) Inventors: Francisco Jose Ballester-Merelo, Valencia (ES); Marcos Antonio Martinez-Peiro, Valencia (ES)

(73) Assignee: Balmart Sistemas Electronicos y de Comunicaciones S.L. (ES)

( * ) Notice: Subject to any disclaimer, the term of this patent is extended or adjusted under 35 U.S.C. 154(b) by 384 days.

(21) Appl. No.: 12/024,341

(22) Filed: Feb. 1, 2008

(65) Prior Publication Data

US 2009/0195396 A1     Aug. 6, 2009

(51) Int. Cl.
    G08B 21/00     (2006.01)
(52) U.S. Cl. ............. 340/540; 340/539.18; 340/539.19; 340/539.2; 340/539.21; 340/539.22; 709/220; 370/270; 713/100
(58) Field of Classification Search .................. 340/540, 340/539.18–539.22; 709/220; 370/270; 713/100
    See application file for complete search history.

(56) References Cited

U.S. PATENT DOCUMENTS

| | | | |
|---|---|---|---|
| 4,090,177 A | 5/1978 | Urata et al. |
| 4,195,286 A | 3/1980 | Galvin |
| 4,363,031 A | 12/1982 | Reinowitz |
| 4,831,361 A | 5/1989 | Kimura |
| 5,124,915 A | 6/1992 | Krenzel |
| 5,587,705 A | 12/1996 | Morris |
| 5,627,515 A | 5/1997 | Anderson |
| 5,659,292 A | 8/1997 | Tice |
| 5,734,335 A | 3/1998 | Brogi et al. |
| 5,898,369 A | 4/1999 | Godwin |
| 6,308,272 B1 | 10/2001 | Pearce |

(Continued)

FOREIGN PATENT DOCUMENTS

EP     0729123 A1     8/1996

(Continued)

OTHER PUBLICATIONS

European Search Report and Written Opinion of the European Patent Office for the European Patent Application No. EP 08 17 3042, mailed Apr. 7, 2010, 11 pages.

*Primary Examiner*—George A Bugg
*Assistant Examiner*—Ojiako Nwugo
(74) *Attorney, Agent, or Firm*—Gallagher & Dawsey Co., LPA; Michael J. Gallagher; David J. Dawsey

(57) ABSTRACT

A multivariate environmental sensing system with redundant transmission pathways with a network of nodes detecting environmental conditions and processing a transmissible signal. Nodes use predetermined criteria to make periodic detections, maintaining a low power state between detections. Power is conserved by deciding whether detections are transmitted immediately, or may be stored for periodic transmission. The nodes power up and immediately transmit urgent detections, storing routine detections for delayed batch transmission. Nodes may transmit signals received from other nodes, passing along signals received from more distant nodes. Transmission may have a predetermined pattern, but the system alters this pattern if there is disruption to the system or pattern. Gateways process data from nodes and pass data to other gateways, on an immediate or deferred basis, to a control center, where data is analyzed. Control centers transmit programming instruction to the gateways and nodes in a retrograde fashion along the transmission pathways.

18 Claims, 12 Drawing Sheets

U.S. PATENT DOCUMENTS

| | | |
|---|---|---|
| 6,392,536 B1 | 5/2002 | Tice et al. |
| 6,690,411 B2 | 2/2004 | Naidoo et al. |
| 6,897,774 B2 | 5/2005 | Costa et al. |
| 7,020,701 B1 | 3/2006 | Gelvin et al. |
| 7,158,021 B2 | 1/2007 | Hammett |
| 2002/0167590 A1 | 11/2002 | Naidoo et al. |
| 2003/0174070 A1 | 9/2003 | Garrod et al. |
| 2005/0271266 A1 | 12/2005 | Perrier |
| 2005/0275527 A1 | 12/2005 | Kates |
| 2005/0275549 A1 | 12/2005 | Barclay et al. |
| 2006/0032863 A1* | 2/2006 | Miller et al. .................. 222/64 |
| 2006/0063522 A1 | 3/2006 | McFarland |
| 2006/0119477 A1 | 6/2006 | Tice |
| 2006/0132485 A1 | 6/2006 | Milinusic |
| 2006/0176169 A1 | 8/2006 | Doolin et al. |
| 2006/0193262 A1 | 8/2006 | McSheffrey et al. |
| 2006/0261979 A1 | 11/2006 | Draaijer et al. |
| 2007/0063840 A1 | 3/2007 | Jentoft |
| 2008/0106403 A1* | 5/2008 | Voglewede et al. .......... 340/540 |
| 2008/0109091 A1 | 5/2008 | Joslin et al. |
| 2008/0220542 A1 | 9/2008 | Micheli et al. |

FOREIGN PATENT DOCUMENTS

| | | |
|---|---|---|
| EP | 0729125 A1 | 8/1996 |
| GB | 2156120 A | 10/1985 |
| GB | 2370400 A | 6/2002 |
| GB | 2401468 A | 11/2004 |
| WO | WO-2004079395 A2 | 9/2004 |
| WO | WO-2004092765 A1 | 10/2004 |
| WO | WO-2005106820 A1 | 11/2005 |
| WO | WO-2006017219 A2 | 2/2006 |
| WO | WO-2006017678 A2 | 2/2006 |
| WO | WO-2006022594 A1 | 3/2006 |
| WO | WO-2006057694 A2 | 6/2006 |

* cited by examiner

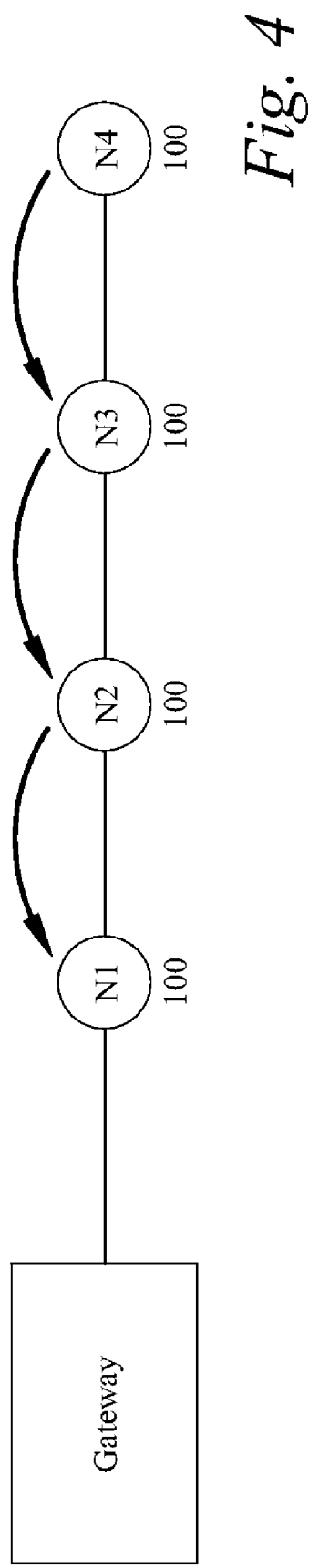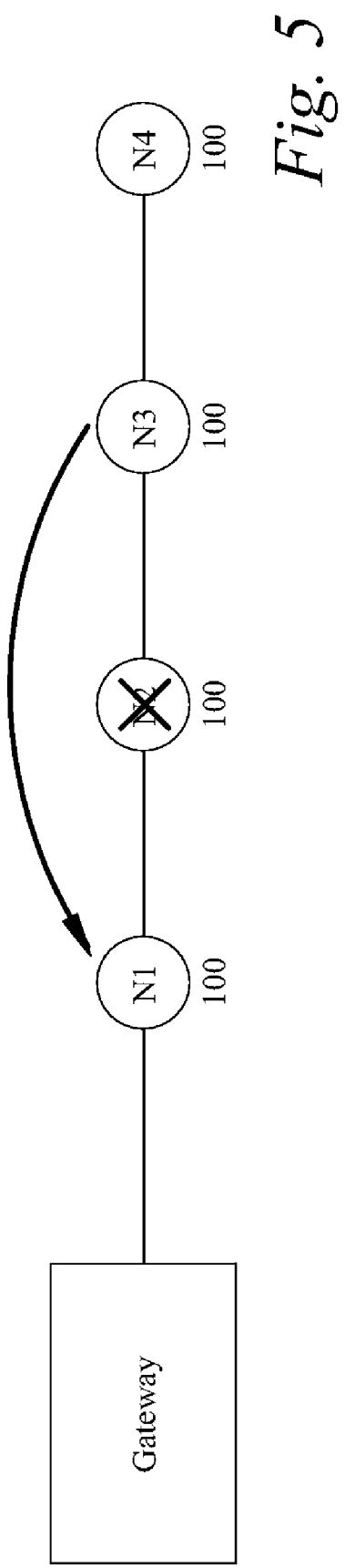

MULTIVARIATE ENVIRONMENTAL SENSING SYSTEM WITH INTELLIGENT STORAGE AND REDUNDANT TRANSMISSION PATHWAYS

TECHNICAL FIELD

The instant invention relates to a multivariate environmental sensing system with intelligent storage and redundant transmission pathways.

BACKGROUND OF THE INVENTION

Environmental sensing systems are required to provide information about environmental conditions, often across wide areas of terrain. For example, it may be desirable to monitor the temperature and humidity at various points across a commercial timberland as a means of detecting incipient or actual forest fires. It might be desirable to monitor air and ground humidity at various points in a farmland environment, to guide the proper application of irrigation water. It could even be desirable to monitor snow temperature and UV light received at various points in a snow field.

Various difficulties attend such monitoring schemes. It may be difficult to provide reliable electrical power in remote areas to power such monitors. It may be difficult to manage the large amount of data produced by a large number of monitors spread across a wide area. It may be difficult to assure reliable transmission of data, especially if environmental, or other, events, damage part of the system. Lastly, such monitoring may need to be dynamic, in that different measurement parameters may be desired at different times and under different conditions. These requirements may to some extent be mutually exclusive, for example, systems with highly reliable transmission may use excessive amounts of power.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations.

In one configuration, the present invention relates to a multivariate environmental sensing system with intelligent storage and redundant transmission pathways and a method for utilizing such a system to accomplish effective long-term monitoring across a potentially wide area. The system and method relies on a system of nodes, each capable of detecting environmental conditions and processing these sensed conditions into a representative and transmissible signal. The nodes have an intelligent design, whereby they may use predetermined criteria to make periodic detections, while maintaining themselves in a relatively low power usage state between detections. Similarly, they conserve power by deciding, again by predetermined criteria, whether certain sensed measurements fall outside of acceptable parameters, and therefore should be transmitted immediately, or whether the detections are reflective of unexceptional environmental conditions and may be stored for periodic transmission. The nodes then implement the selected strategy, powering up and immediately transmitting urgent signals, while storing routine detections for batch transmission on a predetermined basis.

Nodes are not only capable of generating original environmental condition signals themselves, but also are capable of transmitting environmental condition signals received from other nodes. This also contributes to power conservation within the system. Nodes may pass along, in a chain like fashion, signals received from more distant nodes. Transmission may be along a predetermined pattern, but the system may alter this predetermined pattern if there is damage to the system, or any other disruption of the normal predetermined pattern.

Data flows towards gateways, which may assemble and process data from a plurality of nodes. In an analogous fashion to the nodes, gateways may pass along data to other gateways, on an immediate or deferred basis, and along similar predetermined paths. The ultimate goal is for data to reach a control center, where data is ultimately analyzed and dealt with. The control centers also transmit programming instruction to the gateways and nodes in a retrograde fashion along the transmission pathways.

Thus, the system and method may be said to be multivariate, in that while at least two environmental conditions may be sensed, there are few limits on the number of environmental conditions that may be measured, and these environmental conditions may be changed to the measurement of other conditions through the programming capacity of the system and method. The system and method also includes intelligent storage, in that both nodes and gateways are capable of making intelligent decisions as to whether to immediately transmit data or store data for later batch transmission. Lastly, the system and method has redundant pathways, so that damage to a part of the system causes a re-routing of data paths so that only the most minimum amount of monitoring coverage may be lost.

BRIEF DESCRIPTION OF THE DRAWINGS

Without limiting the scope of the present invention as claimed below and referring now to the drawings and figures:

FIG. 4 shows a schematic representation of transmission along nodes toward a gateway of the instant invention;

FIG. 5 shows a schematic representation of transmission along nodes toward a gateway of the instant invention, illustrating a bypassing of a non-functional node by means of increased power transmission;

Figure 1:
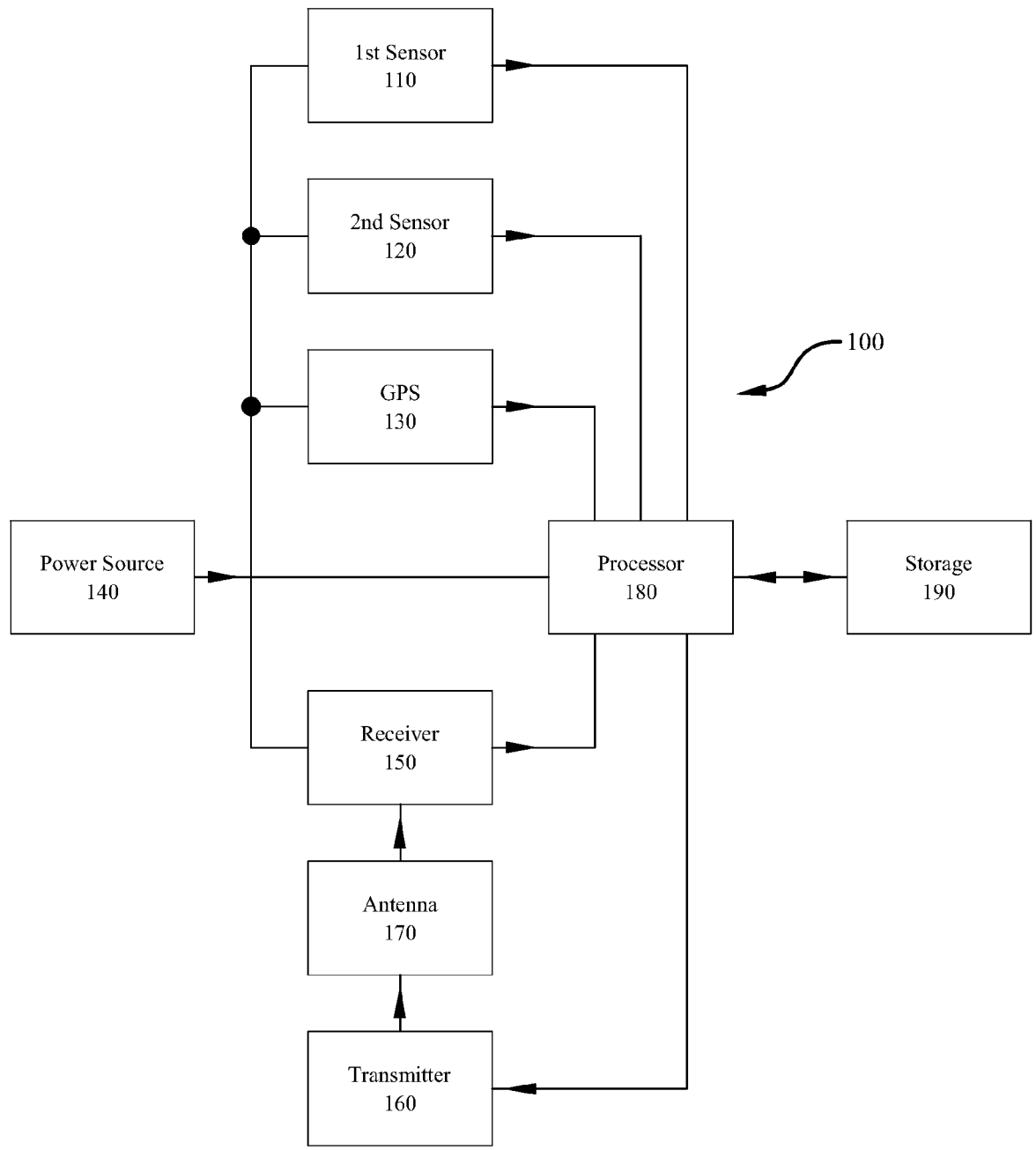
FIG. 1 shows a schematic representation of a node of the instant invention.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The method and materials of the multivariate environmental sensing system with intelligent storage and redundant transmission pathways of the instant invention enables a significant advance in the state of the art. The preferred embodiments of the method and materials accomplish this by new and novel arrangements of elements and methods that are configured in unique and novel ways and which demonstrate previously unavailable but preferred and desirable capabilities.

The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 6:
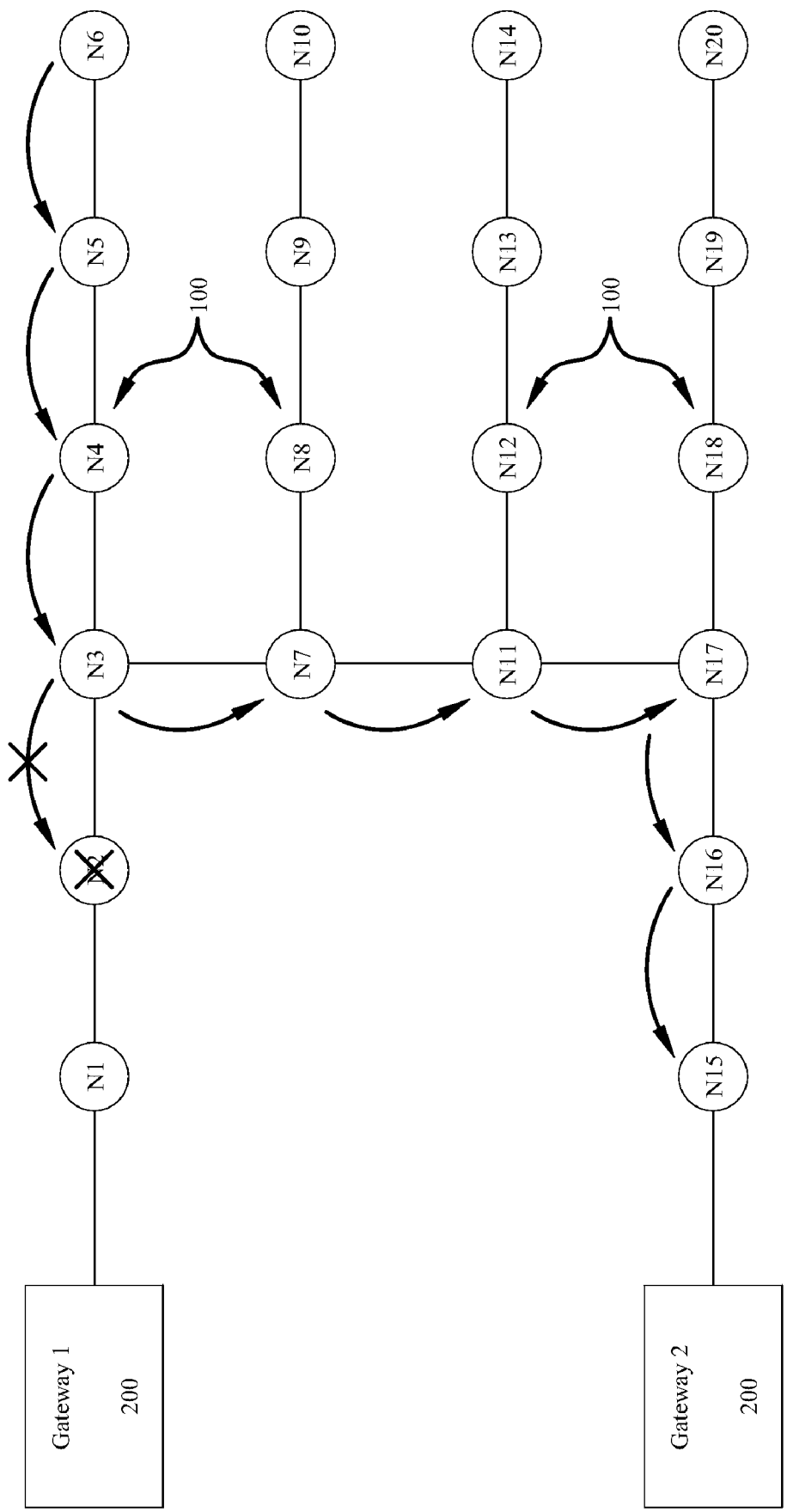
FIG. 6 shows a schematic representation of transmission along nodes toward a gateway of the instant invention, illustrating a bypassing of a non-functional node by means of an altered transmission pattern.
Figure 7:
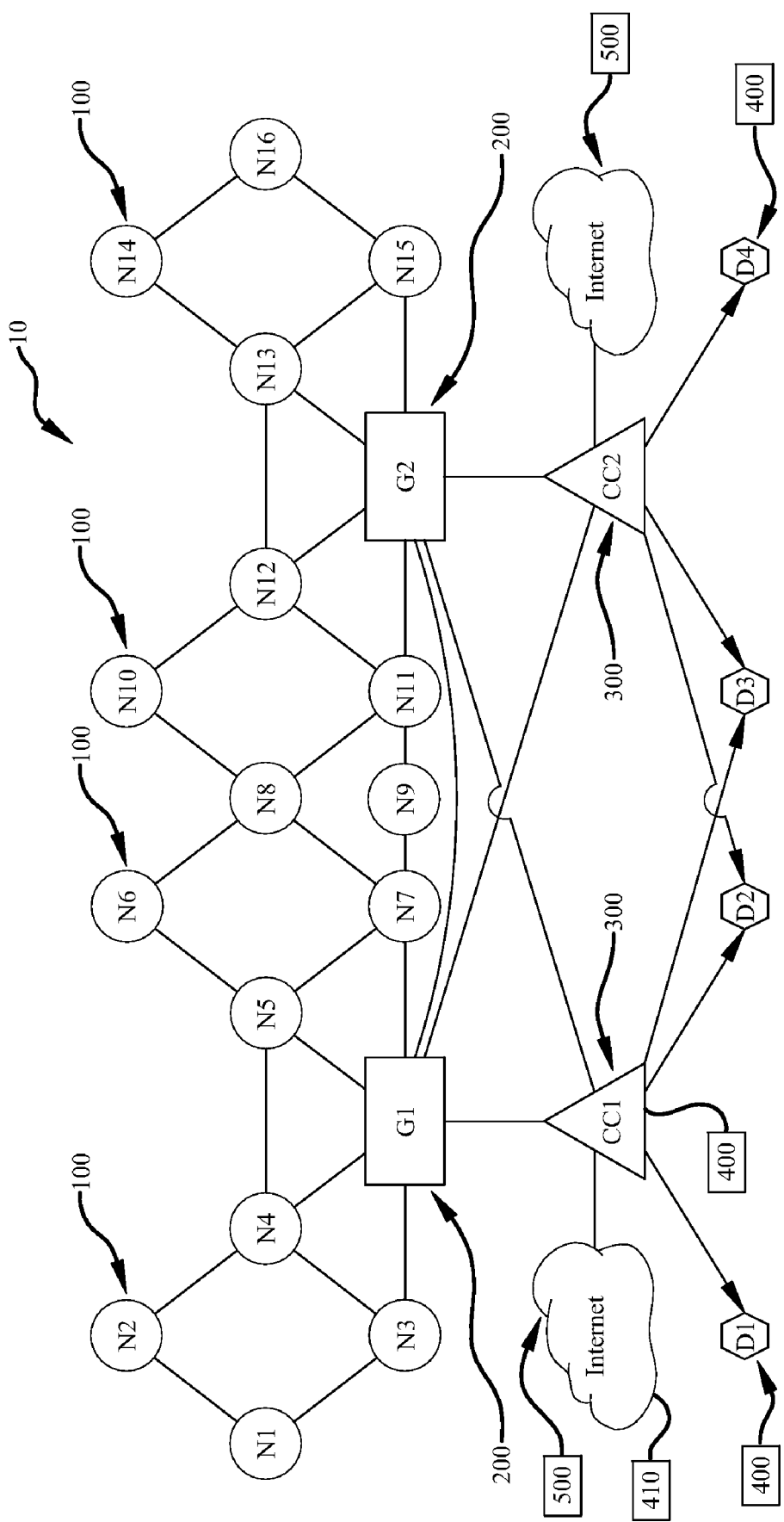
FIG. 7 shows a schematic representation of a system according to the instant invention.

In a preferred embodiment, seen in FIGS. 1-13, a multivariate environmental sensing system (10) with intelligent storage and redundant transmission pathways is disclosed. In its simplest form, the system (10) may include at least a first node (100) and a second node (101), at least a first gateway (200) and a second gateway (201), and at least one control center (300). However, for maximum utility, a system with a plurality of interconnected nodes (100, 101) and gateways (200, 201), such as is seen in FIG. 7, will be a common embodiment.

As to the individual components of the system, the at least first node (100) can be schematically seen in FIG. 1. It includes at least one first nodal power source (140), which may be of many types, as would be known to one skilled in the art. While there may be advantages to having nodes hardwired to an external power source, such as the power grid, the low electrical consumption of the nodes of the instant invention make it feasible to supply power from an internal battery, or alternatively, from a battery supplemented by solar, or other alternative power sources, such as, by way of illustration only, fuel cell, wind, hydroelectric, or geothermal sources. Because many components of the system may be maintained in a powered-down mode, or at a minimum in a power-conserving mode, electrical energy is conserved. In a common embodiment, the low power consumption and intelligent design of the system and method results in a battery life of approximately two years. This is, of course, subject to certain design trade-offs, in that higher power or more frequent transmissions may require a design with a greater battery capacity.

Figure 9:
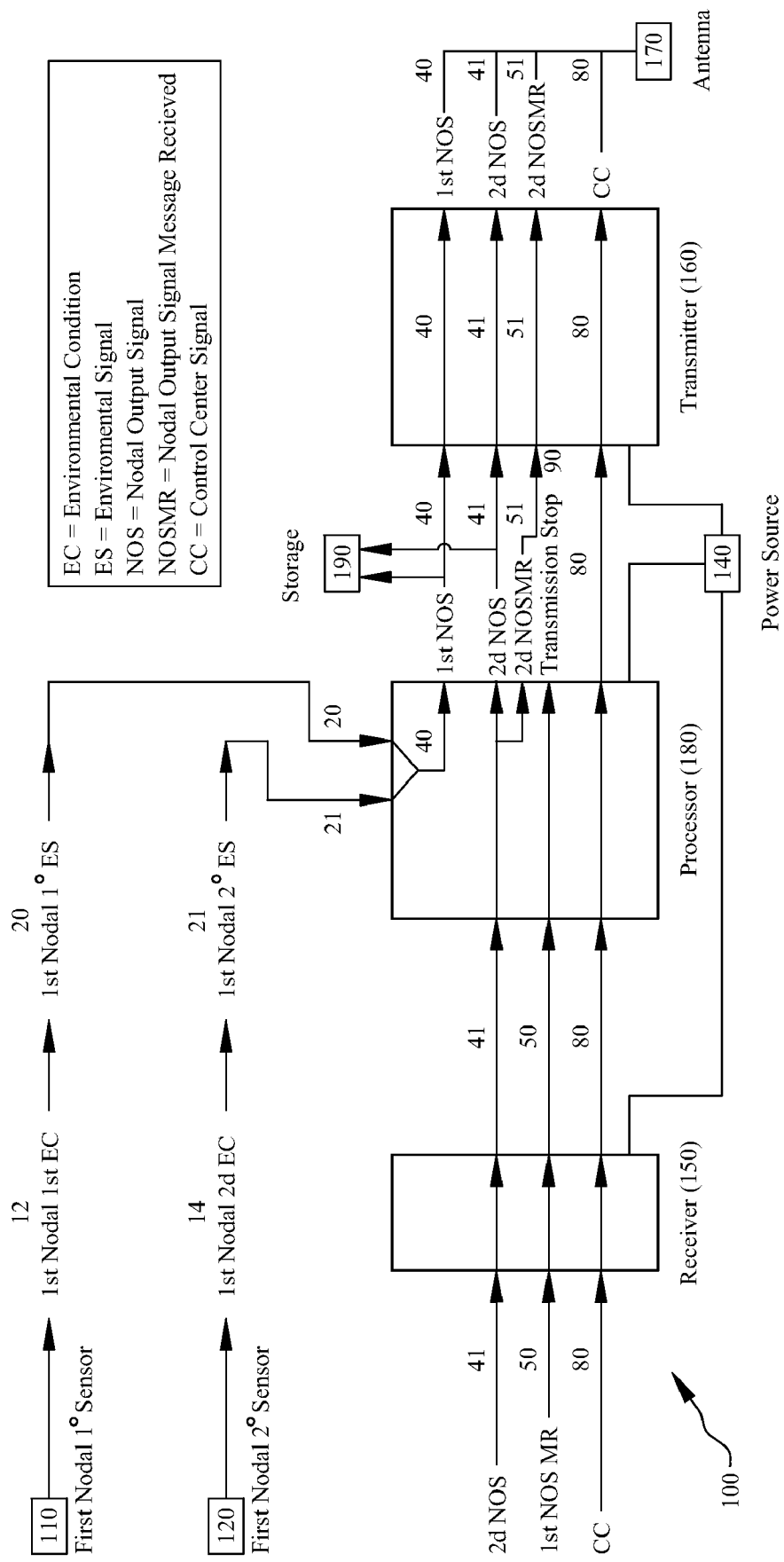
FIG. 9 shows a schematic representation of reception, processing, control, storage, and transmission within a first node of the instant invention.

The at least first node (100) as seen in FIGS. 1 and 9, includes at least a first nodal primary sensor (110) for detecting a first nodal first environmental condition (12) and generating a first nodal first environmental signal (20) representative of the detected first nodal first environmental condition (12); and at least a first nodal secondary sensor (120) for detecting a first nodal second environmental condition (14) and generating a first nodal second environmental signal (21) representative of the detected first nodal second environmental condition (14). There is essentially no limitation on the environmental conditions that may represent the first (12) and second (14) environmental conditions, other than the limits of sensing technology at the time of use. In a preferred embodiment, the environmental conditions may be selected to include what may be termed "chronic" and "acute" conditions. For the purposes of this specification, chronic environmental conditions are those that tend to change relatively slowly over a relatively long period of time, and that may be indicative of long-term environmental trends. On the other hand, acute environmental conditions are those that tend to change quickly over a relatively short period of time. In a highly preferred embodiment, where the system may be used for fire detection, a chronic environmental condition, and one suitable for measurement as the first environmental condition (12) might be humidity, as it is well known that low levels of humidity predispose to increased fire hazard. In such an embodiments, an acute environmental condition, and one suitable for measurement as the second environmental condition (14) might be temperature, as it is well known that a rapidly rising temperature indicates a likelihood of an active fire in the proximate sensing area.

However, these are not the only conditions that may be measured. For example, in a system designed to monitor crop or lawn water needs, the first environmental condition (12) might be relative humidity of the air, while the second environmental condition (14) might be moisture level in the soil. One skilled in the art will realize that the system is not limited to the measurement of two environmental conditions, and that additional sensors may be used to monitor additional conditions, and to therefore generate additional environmental signals.

One skilled in the art will realize that a near infinite number of gradient and change over time parameters may be monitored, and that these parameters may be changed at any time due to the interactivity of the system.

As seen in FIG. 9, the first node (100) also includes at least one first nodal programmable nodal processor (180) for processing the at least first nodal first environmental signal (20) and the first nodal second environmental signal (21) to create a first nodal output signal (40). Also as seen in schematic representation in FIG. 9, the at least one first node (100) has a first nodal receiver (150) for receiving a second nodal output signal (41), for receiving a first nodal output signal message received signal (50), and for receiving a control center programming signal (80). Thus, the interactivity and interlocked activity of the system may be shown. The first node (100), in addition to the sensing, signal creation, and transmission capabilities previously described, may serve as an intelligent link in an overall system (10). For example, the first node (100) may receive a second nodal output signal (41) transmitted by a second node (101) and pass this signal (41) on along a predetermined path. Therefore, there may be significant electrical consumption savings in that any given nodal transmission need only be strong enough to reach another node. Similarly, electrical saving may result in having the first node (100) receive a first nodal output signal message received signal (50), after it has successfully transmitted its first nodal output signal (40) that suspends further transmission, and therefore further electrical consumption, after the first node (100) has successfully passed its first nodal output signal (40) along the system's pathways. The system is also intelligent, because its ability to receive a receiving a control center programming signal (80) allows updating or changing the programming of the first node (100) function.

Continuing as seen in schematic representation in FIG. 9, the first node (100) also includes at least one first nodal programmable nodal processor (180) for not only processing the at least first nodal first environmental signal (20) and the first nodal second environmental signal (21) to create a first nodal output signal (40), but also for creating a storable representation of the first nodal output signal (40), which facilitates another intelligent feature of the system, the ability to choose between immediate and delayed transmission of signals. This leads to even further electrical power savings.

Figure 8:
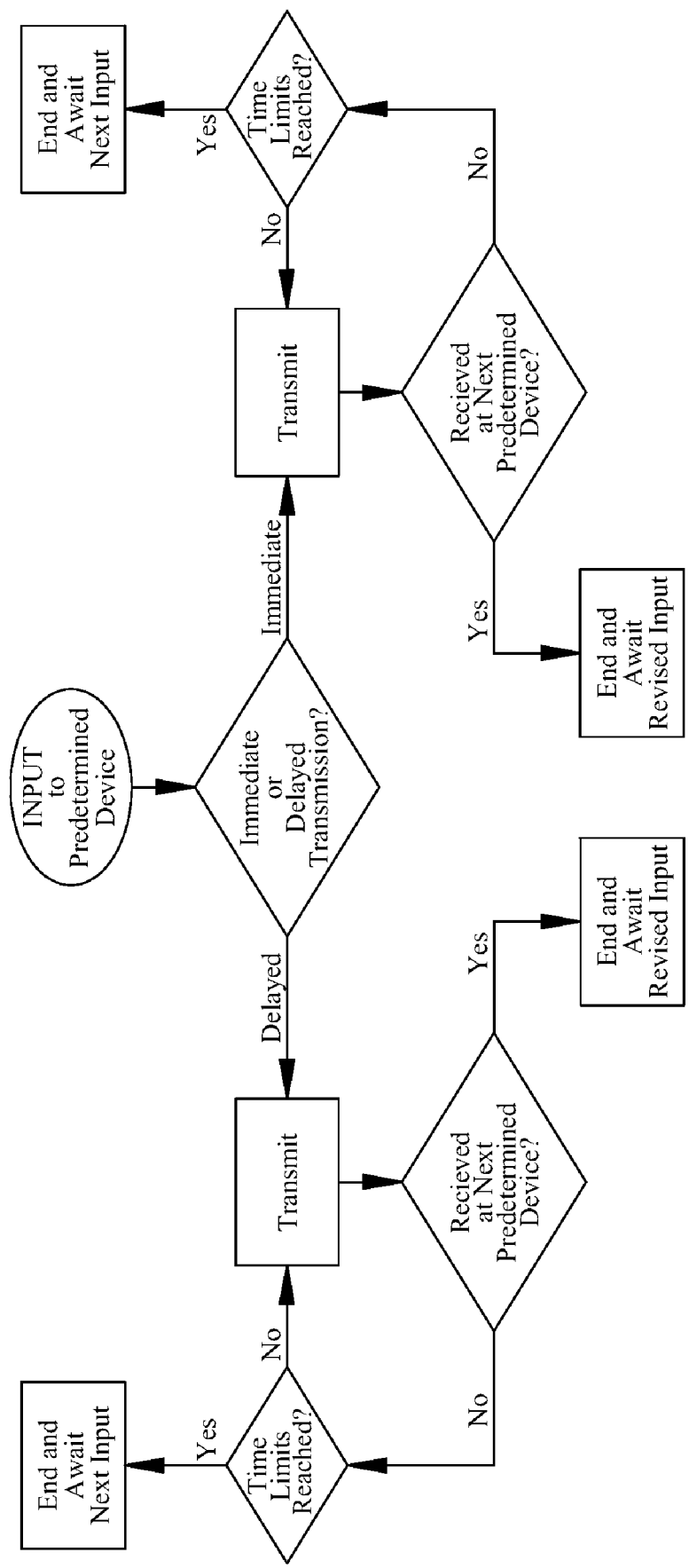
FIG. 8 shows a flow chart representation of a decision tree of the instant invention, illustrating a process by which transmissions are regulated.

For example, as seen in schematic representation in FIG. 8; the node (100) may be programmed so that certain decisional limits are placed on the first environmental condition (12) and second environmental condition (14). To use the fire detection embodiment by way of example only, humidity above and temperature below certain predetermined limits may be considered to be within a "normal" range. Accordingly, first (20) and second (21) environmental signals generated in response to these environmental conditions (12, 14), seen again in FIG. 9, may be transformed into storable digital representations by the first nodal processor (180) and stored in the first nodal storage device (190) for delayed transmission. It is easy to imagine that in monitoring slow evolving environmental situations, environmental conditions may be sampled relatively often, but there is no need to transmit a plurality of normal condition samplings beyond the nodal level. Such a plurality of normal condition detections, or signals, may be stored and then periodically transmitted, making large savings in the amount of time that a nodal transmitter (160) may need to be powered up.

The first nodal processor (180) may also process the first nodal output signal message received signal (50), as such is an indication that a previous signal sent by the first node (100) has been received at its next intended site in the system. In line with the previously discussed capacity for passing messages along the system, the first nodal processor (180) may process the second nodal output signal (41) received from another node, and generating a second nodal output signal message received signal (51) to allow that sending node to know that its signal has been received. Also in keeping with the previously discussed ability of the system to change programming, the first nodal processor (180) may receive and process the control center programming signal (80) through which the systems functions are controlled. The first nodal processor (180) would also be responsible for processing various system status signals, such as a low battery indicator, and conducting such status signals for transmission.

Also as seen in FIG. 9 and discussed above, the first node (100) includes at least one first nodal storage device (190) for storing the storable representation of the first nodal output signal (40); and at least one first nodal transmitter (160) for transmitting the first nodal output signal (40) and for transmitting the second nodal output signal (41) received from any other nodes. The first nodal transmitter (160) also may transmit the second nodal output signal message received signal (51), to allow a sending node to know that its signal has been received, and for transmitting the control center programming signal (80) to other nodes or gateways. For functional purposes, the first node (100) would generally include at least one first nodal antenna (170) in electrical communication with the at least one first nodal transmitter (160), although some embodiments may include transmission over landlines.

Figure 10:
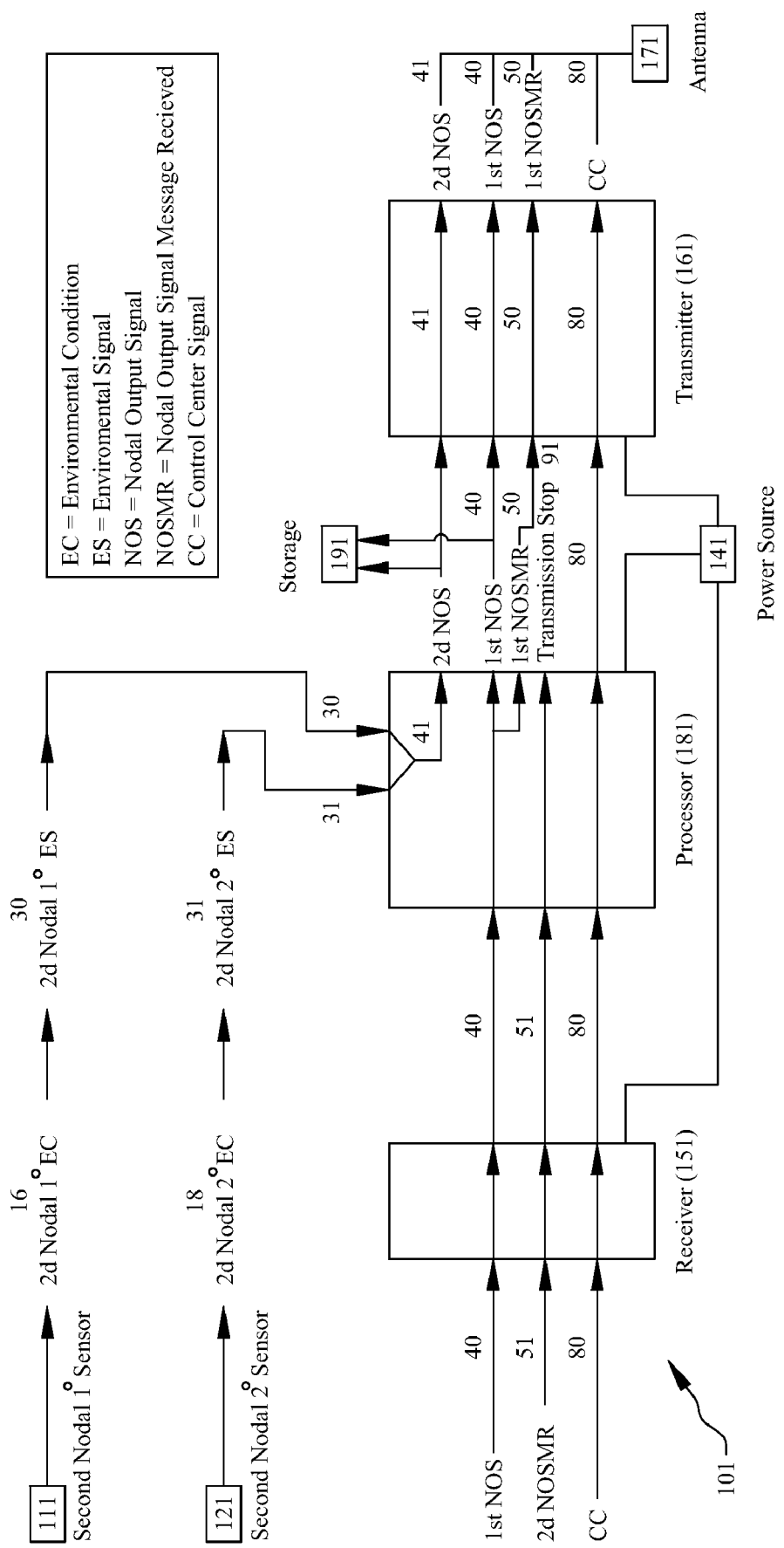
FIG. 10 shows a schematic representation of reception, processing, control, storage, and transmission within a second node of the instant invention.

The system also includes at least a second node (101), seen in schematic representation in FIG. 10, and whose function is quite similar to that of the first node (100). In a typical wireless embodiment, the second node (101) would generally be positioned within 100 meters of the first node (100), although this distance is somewhat variable due to radio transmission efficacy factors, such as terrain. The second node (101) includes at least one second nodal power source (141), which may include any of the embodiments discussed above in relation to the first nodal power source (140). As with the first node (100), the second node (101) includes at least a second nodal primary sensor (111) for detecting a second nodal first environmental condition (16) and generating a second nodal first environmental signal (30) representative of the detected second nodal first environmental condition (16); and at least a second nodal secondary sensor (121) for detecting a second nodal second environmental condition (18) and generating a second nodal second environmental signal (31) representative of the detected second nodal second environmental condition (18).

The second node (101), again as seen in FIG. 10, includes at least one second nodal receiver (151) for receiving the first nodal output signal (40), for receiving the second nodal output signal message received signal (51), and for receiving the control center programming signal (80); thus corresponding to the functions found in the first node (101). There is also at least one second nodal programmable nodal processor (181) for processing the at least second nodal first environmental signal (30) and the at least second environmental signal (31) to create the second nodal output signal (41) and creating a storable representation of the second nodal output signal (41), for receiving the first nodal output signal (40) and generating the first nodal output signal message received signal (50). With the introduction of a second node (101) into the system (10) and as outlined above, the second nodal processor (181) also processes the second nodal output signal message received signal (51), received after successful transmission by the second node (101) and generating a second nodal transmission stop signal (91) that conserves power. As with the first node (100) the second nodal processor (181) receives and processes the control center programming signal (80) through which the programming of the system (10) is controlled.

Again as corresponding to similar structures in the first node (100), the second node (101 includes at least one second nodal storage device (191) for storing the storable representation of the second nodal output signal (41); and at least one second nodal transmitter (161) for transmitting the first nodal output signal (40), for transmitting the second nodal output signal (41), for transmitting the first nodal output signal message received signal (50), and for transmitting the control center programming signal (80).

As with the first node (100), and as seen in FIG. 10, the second node (101) would generally include at least one second nodal antenna (171) in electrical communication with the at least one second nodal transmitter (161); although some embodiments may be configured for transmission over landlines.

Figure 2:
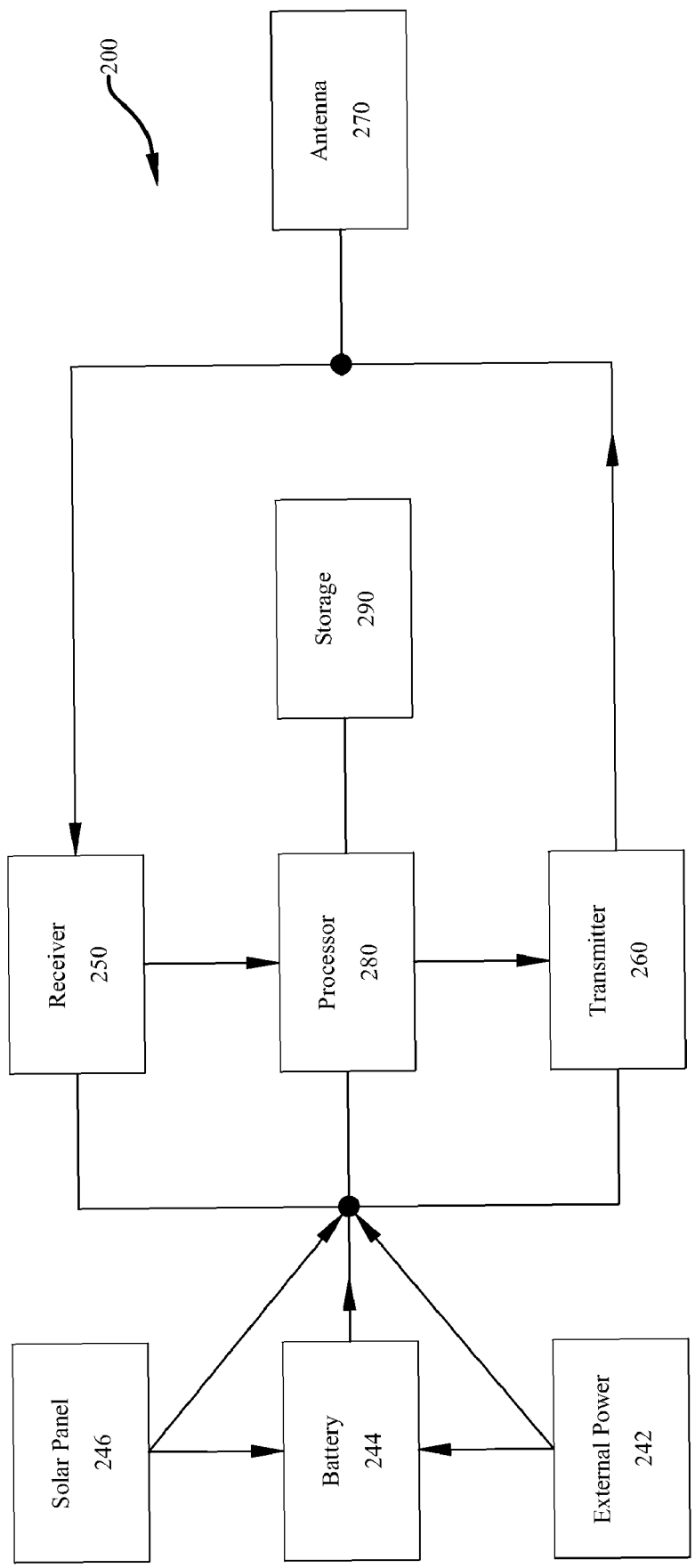
FIG. 2 shows a schematic representation of a gateway of the instant invention.
Figure 11:
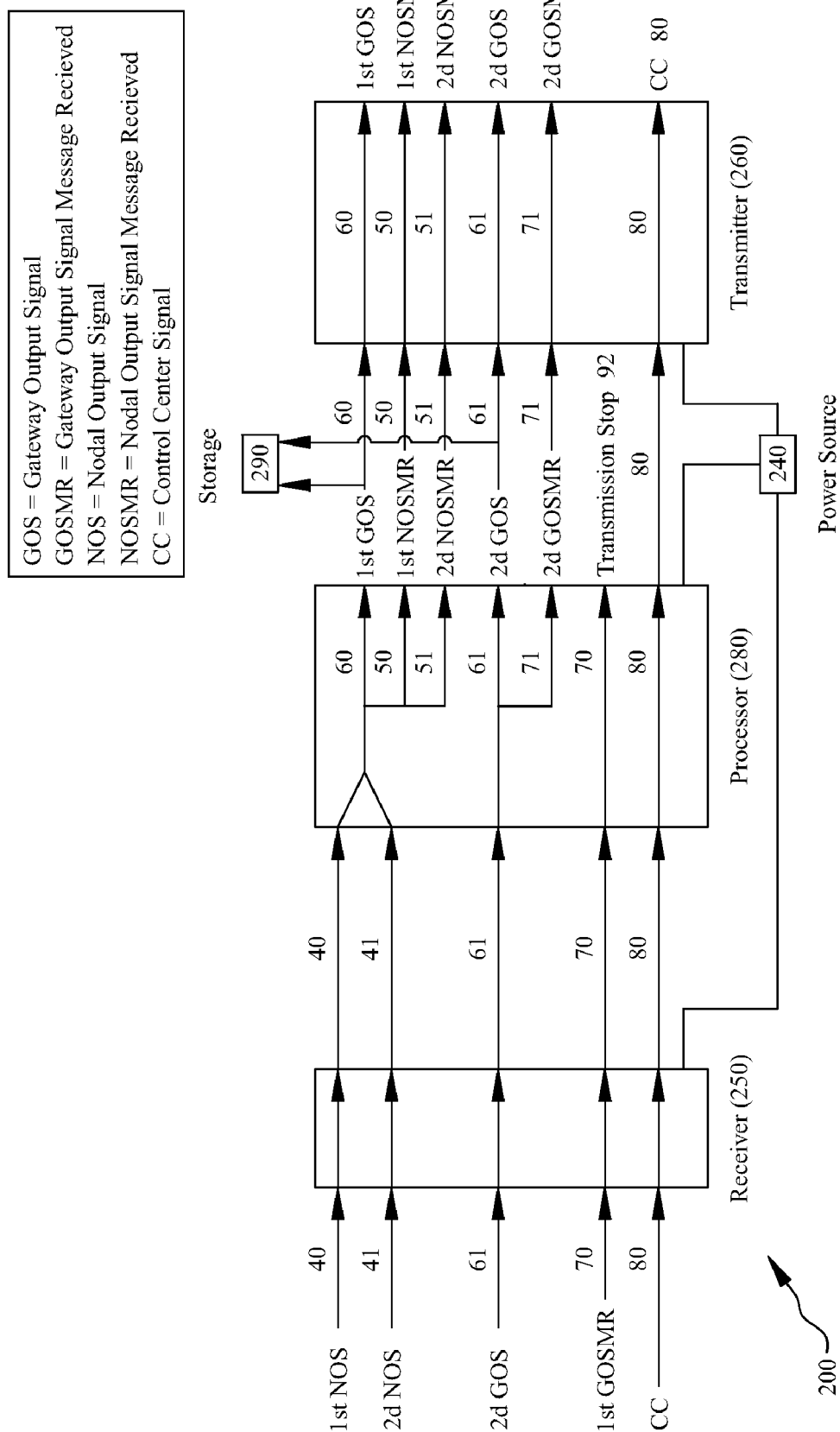
FIG. 11 shows a schematic representation of reception, processing, control, storage, and transmission within a first gateway of the instant invention.

The system also includes at least a first gateway (200), seen in FIGS. 2 and 11, whose purpose may be generally described as synthesizing the reporting and control of a plurality of nodes, and as acting as an intermediate site between the nodes (100, 101) and the control center (300), as may be seen well in FIG. 7.

With reference again to FIG. 11, the at least first gateway (200) further includes at least one first gateway power source (240). In some embodiments, this may be an independent power source, such as described in regard to the first nodal power source (140) and second nodal power source (141) discussed above. However, in some embodiments the at least first gateway may be located in a position more amenable to outside power supplies, and may have higher power consumption than that of the nodes (100, 101).

The at least one first gateway (200) includes at least one first gateway receiver (250) for receiving an output signal selected from the group of output signals consisting of the first nodal output signal (40) and the second nodal output signal (41). This allows the at least one first gateway (200) to receive a plurality of signals from a plurality of nodes (100, 101). Analogous to the ability of the nodes (100, 101) to pass along signals from other nodes, the at least one first gateway receiver (250) includes the ability to receive a second gateway output signal (61), for receiving a first gateway output signal message received signal (70), and for receiving the control center programming signal (80).

At the at least one first gateway (200), and as seen in FIG. 11, the at least one first gateway programmable gateway processor (280) is capable of processing the output signal selected from the group of output signals consisting of the first nodal output signal (40) and the second nodal output signal (41) to create the first gateway output signal (60) and creating a storable representation of the first gateway output signal (60). This allows the at least one first gateway to synthesize input from a plurality of nodes (100, 101) and to create at least one first gateway output signal (60) from such input, and similar to the function seen in the nodes (100, 101) may differentiate between gateway output signals (60) that require either immediate or delayed transmission. The at least one first gateway processor (250) may also generate a nodal output signal message received signal selected from the group of nodal output signal message received signals consisting of the first nodal output signal message received signal (50) and the second nodal output signal message received signal (51), thus allowing the at least one first gateway (200) to signal nodes (100, 101) that their signal has been received. Also in an analogous manner to the sequential function of the nodes (100, 101) in passing signals from one to another, the at least first gateway (200) may interact with a second gateway (201) to pass signals from gateway (200) to gateway (201). In general, a first gateway (201) might be assigned as a transmission destination for a predetermined set of nodes (100, 101); however, in case of failure of the first gateway (201), the nodes (100, 101) could transmit to a second gateway (201). Therefore, and as also seen in FIG. 11, the at least one first gateway processor (250) may also process the first gateway output signal message received signal (70) and generate a first gateway transmission stop signal (92). At the least one first gateway processor (250) may also process the second gateway output signal (61) and generate a second gateway output message signal received signal (71), thus facilitating the transmission of signals from gateway (200) to gateway (201) and may process the control center programming signal (80) through which the function of the nodes (100, 101) and gateways (200, 201) may be altered.

Also analogous to a similar function seen in the nodes (100, 101), the at least one first gateway (200) includes a first gateway storage device (290) for storing the storable representation of the first gateway output signal (60). Thus, the at least one first gateway (200) may essentially collect a plurality of representations of signals from the nodes (100, 101) and other gateways (201) indicative of environmental conditions (16, 18) that fall within predetermined normal limits, and then transmit these signals collectively on a predetermined time basis, with a typical decision tree being seen in FIG. 8. Again, this serves to decrease power consumption by decreasing the amount of time that that first gateway transmitter needs to be powered up.

As indicated, and as seen in FIG. 11, the at least one first gateway transmitter (260) may transmit a gateway output signal selected from the group of gateway output signals consisting of the first gateway output signal (60) and the second gateway output signal (61), thus facilitating the passage of signals from gateway (200) to gateway (201). The at least one gateway transmitter (260) may also transmit a nodal output signal message received signal selected from the group of nodal output signal message received signals consisting of the first nodal output signal message received signal (50) and the second nodal output signal message received signal (51), and for transmitting a second gateway output message signal received signal (71), all signaling that a passed signal has been received by the gateway (200). Additionally, the at least one first gateway transmitter may transmit the control center programming signal (80); through which the function of the nodes (100,101) and gateways (200, 201) may be altered.

Figure 12:
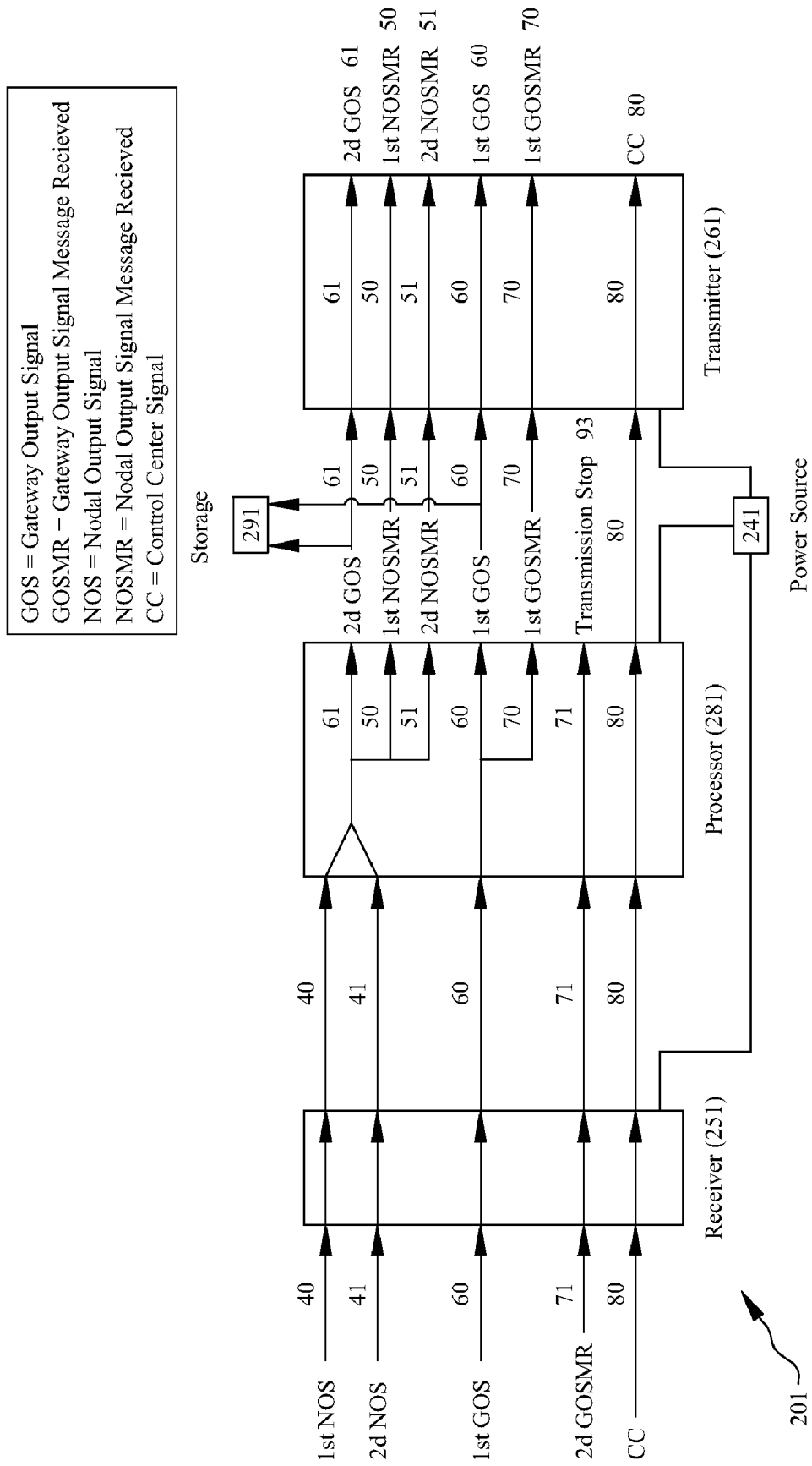
FIG. 12 shows a schematic representation of reception, processing, control, storage, and transmission within a second gateway of the instant invention.

As noted, and as seen well in FIG. 12, the system (10) also includes at least a second gateway (201) which functions in a similar manner to the at least one first gateway (200). Of course, just as there may be a plurality of nodes (100, 101), there may be a plurality of gateways (200, 201). The at least a second gateway (201) includes at least one second gateway power source (241). There is at least one second gateway receiver (251) for receiving an output signal selected from the group of output signals consisting of the first nodal output signal (40) and the second nodal output signal (41), for receiving the first gateway output signal (60), for receiving a second gateway output signal message received signal (71), and for receiving the control center programming signal (80).

There is also, as seen in FIG. 12, a at least one second gateway programmable gateway processor (281) for processing the output signal selected from the group of output signals consisting of the first nodal output signal (40) and the second nodal output signal (41) to create the second gateway output signal (61) and creating a storable representation of the second gateway output electrical signal (61). This at least one second gateway programmable gateway processor (281) is also responsible for generating a nodal output signal message received signal selected from the group of nodal output signal message received signals consisting of the first nodal output signal message received signal (50) and the second nodal output signal message received signal (51), for processing the first gateway output signal (60) and generating the first gateway output signal message received signal (70), and for processing the control center programming signal (80).

Analogous to the function of comparable features in the at least one first gateway (200), there is a second gateway storage device (291) for storing the storable representation of the second gateway output signal (61). Similarly, there is at least one second gateway transmitter (261) for transmitting a gateway output signal selected from the group of gateway output signals consisting of the first gateway output signal (60) and the second gateway output signal (61), for transmitting a nodal output signal message received signal selected from the group of nodal output signal message received signals consisting of the first nodal output signal message received signal (50) and the second nodal output signal message received signal (51), for transmitting the first gateway output signal message received signal (70), and for transmitting the control center programming signal (80). Thus through the linkage of at least a first gateway (200) and at least a second gateway (201) redundancy and economy is created in the management of a plurality of nodes (100, 101).

Figure 3:
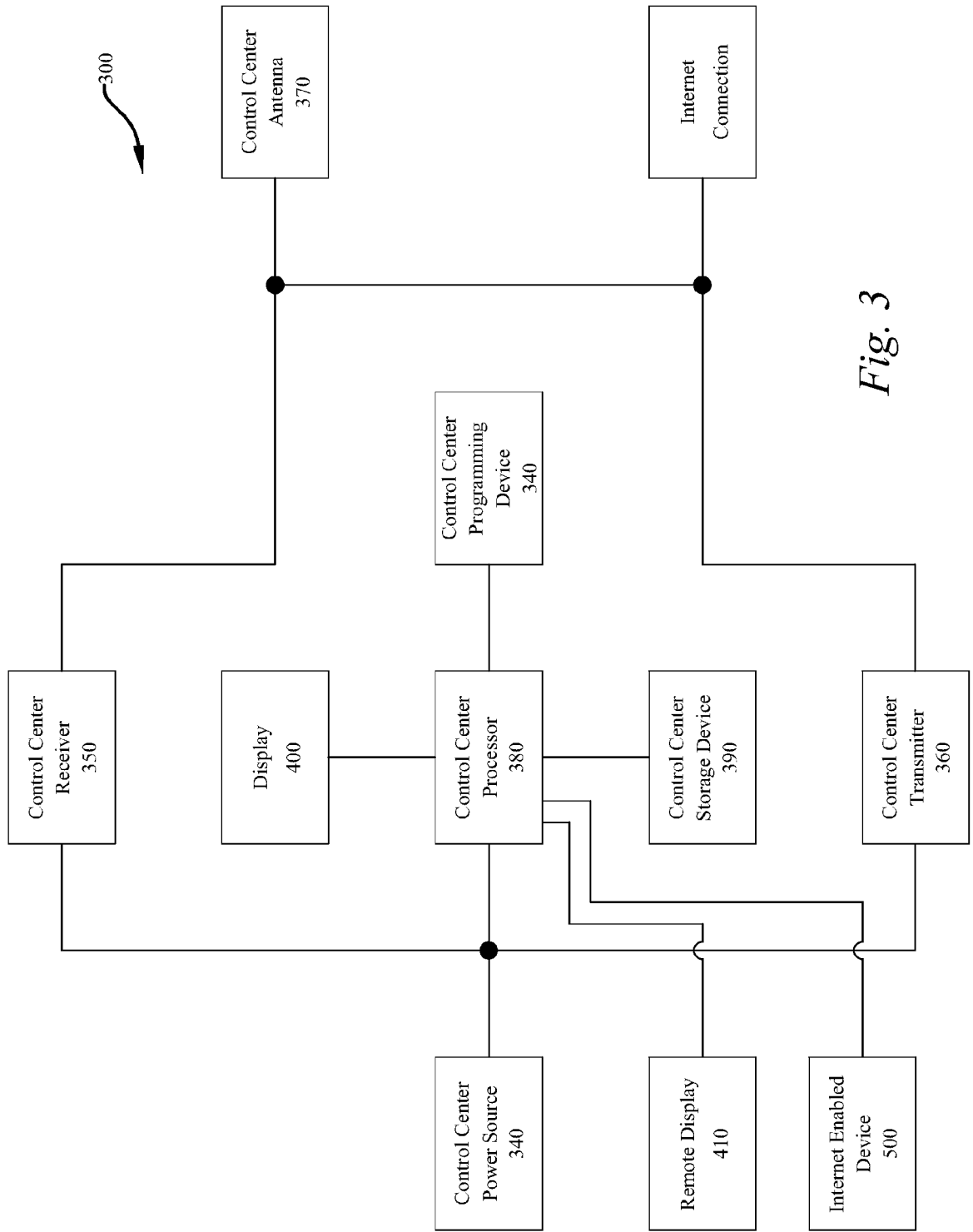
FIG. 3 shows a schematic representation of a control center of the instant invention.
Figure 13:
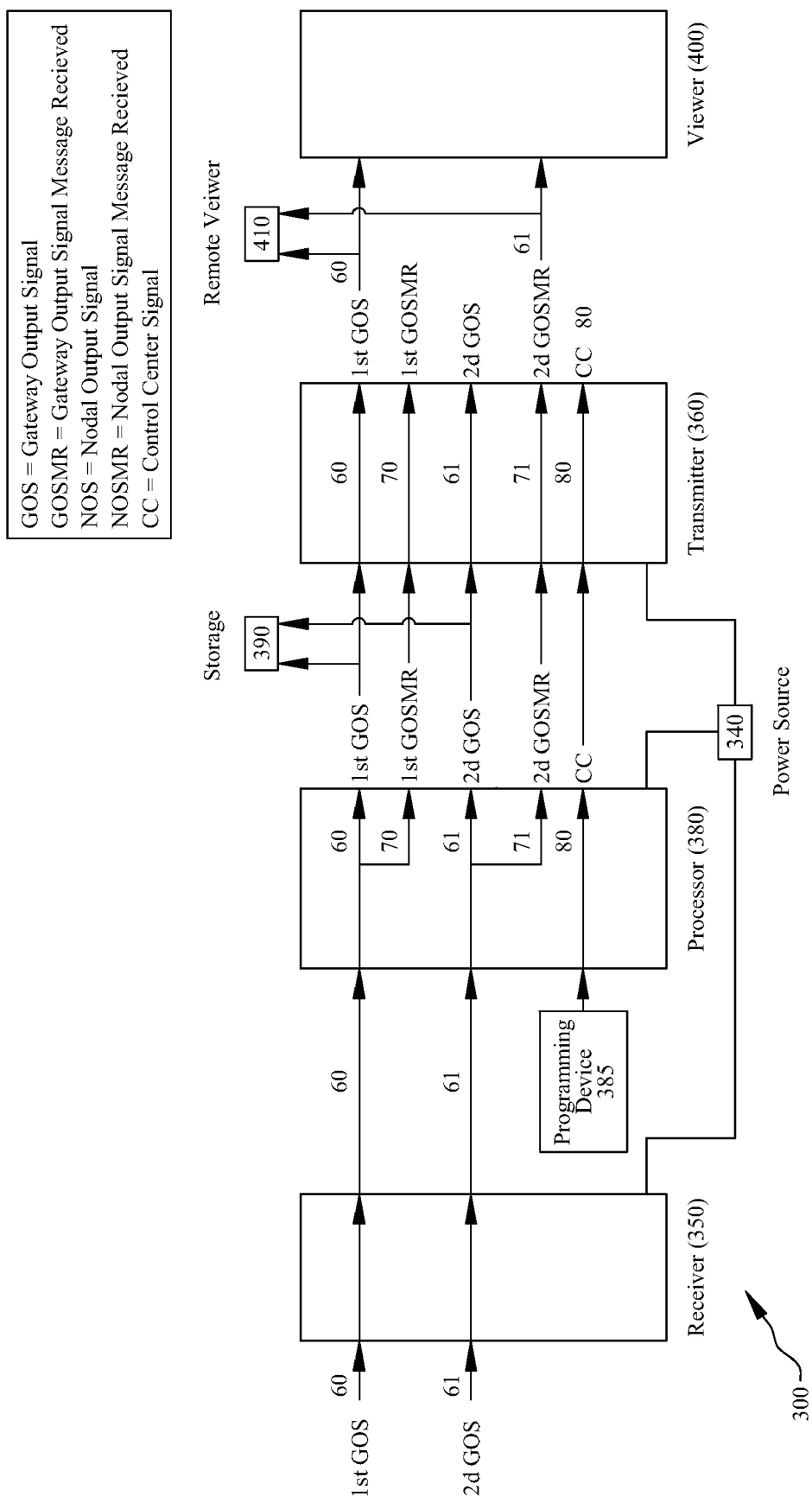
FIG. 13 shows a schematic representation of reception, processing, control, storage, and transmission within a control center of the instant invention.

The system is controlled overall from at least one control center (300) which, as seen in FIGS. 3 and 13 has at least one control center power source (340). This may be any power source described above or otherwise know to one skilled in the art. There is also at least one control center receiver (350) for receiving the first gateway output signal (60) and the second gateway output signal (70).

A critical component is the at least one programmable control center processor (380) for processing the first gateway output signal (60) and the second gateway output signal (70) and for creating a storable representation of the first gateway output signal (60) and the second gateway output signal (70). It also important for creating a humanly perceptible representation of the first gateway output signal (62) and a humanly perceptible representation of the second gateway output signal (63). There is at least one control center storage device (390) for storing a digital representation of the first gateway output signal (60) and the second gateway output signal (61). The at least one programmable control center processor (380) is responsible for generating the first gateway output signal message received signal (70) and for generating the second gateway output signal message received signal (71), so that gateways (200, 201) may be signaled that their signals have been received by the control center (300). It is also responsible for processing the control center programming signal (80), which will be discussed in greater detail immediately below.

A unique attribute of the system (10) is the at least one control center programming device (385) for creating the control center programming signal (80) and for thereby remotely programming the first nodal programmable processor (180), the second nodal programmable processor (181), the first gateway programmable processor (280), and the second gateway programmable processor (281).

Through this modality, the system (10) may be tuned and adjusted to meet a wide variety of needs, as would be envisioned by one skilled in the art. For example, nodes (100, 101) may be instructed to vary the sampling times at which they monitor environmental conditions (16, 18). Parameters considered "normal," which thereby affect the decision as to whether to make an immediate or delayed transmissions may be altered. The transmission patterns may be altered so that non-functional nodes, as seen in FIG. 6, may be readily bypassed. In short, the at least one control center programming device (385) nay be responsible for altering the relationships between some or all of the various components of even a large system (10), such as that illustrated in FIG. 7. There is no need for the at least one control center programming device (285) to be hard-wired to the system (10), or even to be in physical proximity to the remaining components of the system (10). In one preferred embodiment, the control center programming device (385) is in communication with the control center (300) through the internet.

The at least one control center (300) may include at least one control center transmitter (360) for transmitting the first gateway output signal message received signal (70), the second gateway output signal message received signal (71), and the control center programming signal (80).

As seen in FIG. 7 and FIG. 13, the at least one control center (300) may include at least one display device (400) for displaying the humanly perceptible representation of the first gateway output signal (62) and the humanly perceptible representation of the second gateway output signal (63). As with the at least one control center programming device (385), there is no need for the at least one display device to be hard-wired to the system (10), or even to be in physical proximity to the remaining components of the system (10). In one preferred embodiment, the display device (400) further includes at least one remote display device (410) remote from the control center (300), and the remote display device (410) may be in communication with the control center (300) via the internet. Thus, the system (10) may be managed at a great physical distance from the geographic location of the monitoring nodes (100, 101).

A wide variety of additional embodiments are possible, all cooperating and usable with the basic components of the system as discussed above. For example, the system (10) may have a self-mapping capacity, wherein at least one of the at least one nodes (100, 101) further comprises a first nodal GPS device (130) in communication with the nodal processor (180) to generate a GPS coordinate signal (99), and the GPS coordinate signal (99) is transmittable by at least one of the at least one nodal transmitters (160, 161). In such an embodiment, nodes (100, 101) could be placed in environments to be monitored, and the nodes (100, 101) could, as a threshold matter, map themselves both as to absolute location and relative to each other and assist in the determination of appropriate transmission routes.

The system may equally well be disclosed as a method, in terms of the function of the elements described above, thereby being a method for detecting and monitoring environment conditions.

In such a method, steps begin with positioning at least a first node (100) and at least a second node (101) in an area to be monitored. At least a first gateway (200) in positioned in 15 radio communication with the at least first node (100) and a control center (300) is positioned in radio communication with the at least one gateway (200).

Data collection begins with generating at least one environmental signal (20, 21) from a sensor selected from the group of sensors consisting of a first and second nodal sensor (110, 120) of the at least one node (100); and processing these signals (20, 21) in a first nodal programmable processor (180) to generate a first nodal output signal (40).

The method displays intelligent sampling and collection as it makes a nodal output signal (40) disposition on the basis of predetermined criteria to make a disposition selected from the group of dispositions consisting of immediate transmission of the first nodal output signal (40) and deferred transmission of the first nodal output signal (40). In the case of nodal output signals (40) considered suitable for delayed transmission, that is, for signals that are within predetermined normal parameters, the method effects storage in a first nodal storage device (190) of a digital representation of the first nodal output signals (40) reflective of dispositions for deferred transmission. Periodic transmission by a first nodal transmitter (160) may then be made on a predetermined schedule of a digital representation of the first nodal output signals (40) reflective of dispositions for deferred transmission to at least one receiving site selected from the sites consisting of at least a second node (120) and the at least first gateway (200) along a predetermined transmission pattern.

For nodal output signals considered suitable for immediate transmission, that is, those falling outside of predetermined normal parameters, or otherwise indicative of a situation requiring acute intervention, the method effects immediate transmission by the nodal transmitter (160) of a digital representation of the first nodal output signal (40). These transmissions are made to at least one receiving site selected from the sites consisting of at least the second node (120) and the at least first gateway (200), along a predetermined transmission pattern. The signal maybe passed from node (100) to node (101), as seen in FIG. 4. The obvious limitation of the predetermined pattern shown in FIG. 4 is that interruption of transmission caused by any one node, i.e., any of nodes N1, N2, N3, or N4, as seen in FIG. 4, could result in at least partial system failure.

At the receiving site, the method generates a first nodal output signal message received signal (50) in the at least one receiving site and transmits it for receipt to the at least one first node (100). If transmission is not successful, the method repeats the transmission steps repeat by a series of alternate transmission steps selected from the group of steps consisting of higher powered transmissions, such as that seen in FIG. 5, and a predetermined hierarchy of predetermined transmission patterns, such as those seen in FIG. 6, for a predetermined period of time until the receiving site is the at least one first gateway (200) and the first nodal output signal message received signal (50) is generated and transmitted to the at least one first node (100), and the first nodal output signal message received signal (50) is received by the at least one first node (100). At this point, the signal has passed, and transmission by the node (100) may cease until new input is received. One skilled in the art will see that the method may easily include a reporting of node fall, or node failure, indicated by the method resorting to its alternates in the predetermined transmission patterns. The failed node, or nodes, could be immediately reported and scheduled for maintenance or replacement. Similarly, the method may allow far various time limitations, such as, but not limited to: the number of times a node will attempt transmission or the period of time during which a node may attempt transmission, the amount of time that may elapse before alternate routes of transmission are attempted, etc.

At a gateway (200), the method processes the first nodal output signal (40) in the gateway processor to create a first gateway output signal (60). At the gateway (200), and analogous to the disposition process in the nodes (100, 101) the method make a disposition of the first gateway output signal (60) on the basis of predetermined criteria to make a disposition selected from the group of dispositions consisting of immediate transmission of the first gateway output signal (60) and deferred transmission of the first gateway output signal (60).

The method effects storage in a gateway storage device (290) of a digital representation of the first gateway output signal (60) reflective of dispositions for deferred transmission; and effects periodic transmission by a gateway transmitter (260) on a predetermined schedule of a digital representation of the first gateway output signal (60) reflective of disposition for deferred transmission to at least one receiving site selected from the sites consisting of at least a second gateway (201) and the control center (300) along a predetermined transmission pattern.

For those first gateway output signals (60) indicative of a need for immediate transmission, the method effects immediate transmission by the gateway transmitter (260) of a digital representation of the first gateway output signal (60) reflective of disposition for immediate transmission to at least one receiving site selected from the sites consisting of at least the second gateway (201) and the control center (300) along a predetermined transmission pattern.

At the second gateway (201) or control center (300), the method generates a first gateway output signal received signal (71) in the at least one receiving site and transmits it for receipt to the at least one first gateway (200); thus signaling that the signal has been passed.

Transmission paths among gateways (200, 201) and control center (300) are also, like that of the nodes (100, 101), both redundant and intelligent, and transmission steps are repeated by a series of alternate transmission steps selected from the group of steps consisting of higher powered transmissions and a predetermined hierarchy of predetermined transmission patterns until the receiving site is the control center (300) and the first gateway output signal received message (70) is received by the at least one gateway (200).

At the control center (300), the method further processes the first gateway output signal (60) to create a humanly perceptible representation of the first gateway output signal (70). Additionally, the first gateway output signal (60), and any other gateway output signals received (61) may be subject to automated analysis and further processing in a wide variety of manners. The method may further include the step of transmitting the humanly perceptible representation of the first gateway output signal (70) to a plurality of distance sites, and the generation and storage of a digital representation of the first gateway output signal (70) in a control center storage device (390).

Many variants of the above method are possible and all are consistent with the basic method described. One of the preferred embodiments of the method further includes the step of remotely altering the programming of one of the processors selected from the group of processors consisting of the at least one nodal processor (180) and at least one gateway processor (280) from the control center (300). This may include the step of altering the programming of a programmable processor selected from the group of programmable processors consisting of the at least first nodal programmable processor (180) and the at least one first gateway programmable processor (280) by means of a signal transmitted by the control center transmitter (360).

As disclosed above, one of the features of the system (10) is the ability to transmit signals only when needed, and thereby to control electrical consumption within the system (10). Some embodiments of the method may accomplish this by including a step where the receipt of the first nodal output signal received signal (50) by the at least first node (100) creates a first nodal transmission stop signal (90) that stops further transmission until there is a change in at least one predetermined parameter of the first nodal output signal (40). Similarly, on the level of the gateways (200, 201), the system may accomplish such economies by including a step where the receipt of the first gateway output signal message received signal (70) by the at least first gateway (200) creates a first gateway transmission stop signal (92) that stops further transmission by the first gateway transmitter (260) until there is a change in at least one predetermined parameter of the first gateway output signal (60).

The method may also include the step of geographically mapping the relative location of the at least first node (100) and the at least second node (101). This step may be accomplished by any known method of geographically locating the nodes (100, 101), for example, by placing the nodes (100, 101) in predetermined geographic locations. Alternatively, the method may include steps that allow the system (10) to "self-map" itself. Such steps could include determining an absolute geographic position of the at least first node (100) and the at least second node (101) by GPS and then reporting the absolute geographic position of the at least first node (100) and at least second node (101) to the control center programmable processor (380) by means of at least one transmitted GPS location signal.

The control center programmable processor (380) could then map the absolute positions of the at least first node (100) and at least second node (101), to determine the relative positions of the at least first node (100) and the at least second node (101). Such mapping could provide information that would influence the determination of the predetermined transmission patterns at least in part on the basis of the relative positions of the at least first node (100) and at least second node (101). For example, such mapping would allow the system (10) and method not only to know the precise location of all nodes (100, 101), but would allow the system (10) and method to consider such variables as the distance between nodes (100, 101) and possibly topographic features near and between nodes (100, 101), so that optimal transmission patterns could be devised.

In its most basic form, therefore, a simplified embodiment of the method includes at least the following steps: (a) positioning at least one sensor in at least one first node (100) in an area to be monitored;

(b) sensing at least one environmental condition with the at least one sensor; (c) creating a digital representation of the at least one environmental condition; and (d) choosing between an immediate transmission of a representation of the environmental condition and a deferred transmission of the representation of the environmental condition on the basis of predetermined criteria.

Depending on the disposition made, the method may include: (e) storing a representation of the environmental condition selected for deferred transmission; and (f) transmitting the representation of the environmental condition selected for immediate transmission on an immediate basis and the representation of the environmental condition selected for deferred transmission on a periodic predetermined basis.

The system may also include: (g) receiving the representation of the environmental condition in at least one gateway (200) and further processing the representation of the environmental condition; (h) choosing between an immediate transmission of the representation of the environmental condition and a deferred transmission of the representation of the environmental condition on the basis of predetermined criteria; and (i) transmitting the representation of the environmental condition selected for immediate transmission on an immediate basis and the representation of the environmental condition selected for deferred transmission on a periodic predetermined basis.

Ultimately, the method results in: (j) receiving the representation of the environmental condition in at least one control center (300) and further processing the representation of the environmental condition; and (k) making at least one assessment of the environmental condition.

In various additional embodiments, the method may include altering at least one of the predetermined criteria of steps selected from the group of steps consisting of step (d) and step (h) immediately above in response to the assessment of the environmental condition. In a similar fashion, the method may include altering at least one of the periodic predetermined basis of steps selected from the group of steps consisting of step (f) and step (i) immediately above in response to the assessment of the environmental condition. In sum, the criteria by which the decision to make immediate or deferred transmission may be altered.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A multivariate environmental sensing system (10) with intelligent storage and redundant transmission pathways comprising: at least a first node (100) and a second node (101), at least a first gateway (200) and a second gateway (201), and at least one control center (300), wherein;

(a) the at least first node (100) further comprises;

at least one first nodal power source (140);

at least a first nodal primary sensor (110) for detecting a first nodal first environmental condition (12) and generating a first nodal first environmental signal (20) representative of the detected first nodal first environmental condition (12);

at least a first nodal secondary sensor (120) for detecting a first nodal second environmental condition (14) and generating a first nodal second environmental signal (21) representative of the detected first nodal second environmental condition (14);

at least one first nodal receiver (150) for receiving a second nodal output signal (41), for receiving a first nodal output signal message received signal (50), and for receiving a control center programming signal (80);

at least one first nodal programmable nodal processor (180) for processing the at least first nodal first environmental signal (20) and the first nodal second environmental signal (21) to create a first nodal output signal (40) and creating a storable representation of the first nodal output signal (40), for processing the first nodal output signal message received signal (50), for processing the second nodal output signal (41) and generating a second nodal output signal message received signal (51), and for receiving and processing the control center programming signal (80);

at least one first nodal storage device (190) for storing the storable representation of the first nodal output signal (40); and at least one first nodal transmitter (160) for transmitting the first nodal output signal (40), for transmitting the second nodal output signal (41), for transmitting the second nodal output signal message received signal (51), and for transmitting the control center programming signal (80);

at least one first nodal antenna (170) in electrical communication with the at least one first nodal transmitter (160); and (b) the at least second node (101) further comprises;

at least one second nodal power source (141);

at least a second nodal primary sensor (111) for detecting a second nodal first environmental condition (16) and generating a second nodal first environmental signal (30) representative of the detected second nodal first environmental condition (16);

at least a second nodal secondary sensor (121) for detecting a second nodal second environmental condition (18) and generating a second nodal second environmental signal (31) representative of the detected second nodal second environmental condition (18);

at least one second nodal receiver (151) for receiving the first nodal output signal (40), for receiving the second nodal output signal message received signal (51), and for receiving the control center programming signal (80);

at least one second nodal programmable nodal processor (181) for processing the at least second nodal first environmental signal (30) and the at least second environmental signal (31) to create the second nodal output signal (41) and creating a storable representation of the second nodal output signal (41), for receiving the first nodal output signal (40) and generating the first nodal output signal message received signal (50), for processing the second nodal output signal message received signal (51) and generating a second nodal transmission stop signal (91), and for receiving and processing the control center programming signal (80);

at least one second nodal storage device (191) for storing the storable representation of the second nodal output signal (41); and at least one second nodal transmitter (161) for transmitting the first nodal output signal (40), for transmitting the second nodal output signal (41), for transmitting the first nodal output signal message received signal (50), and for transmitting the control center programming signal (80);

at least one second nodal antenna (171) in electrical communication with the at least one second nodal transmitter (161); and (c) the at least first gateway (200) further comprises;

at least one first gateway power source (240);

at least one first gateway receiver (250) for receiving an output signal selected from the group of output signals consisting of the first nodal output signal (40) and the second nodal output signal (41), for receiving a second gateway output signal (61), for receiving a first gateway output signal message received signal (70), and for receiving the control center programming signal (80);

at least one first gateway programmable gateway processor (280) for processing the output signal selected from the group of output signals consisting of the first nodal output signal (40) and the second nodal output signal (41) to create the first gateway output signal (60) and creating a storable representation of the first gateway output signal (60), for generating a nodal output signal message received signal selected from the group of nodal output signal message received signals consisting of the first nodal output signal message received signal (50) and the second nodal output signal message received signal (51), for processing the first gateway output signal message received signal (70) and generating a first gateway transmission stop signal (92), for processing the second gateway output signal (61) and generating a second gateway output message signal received signal (71), and for processing the control center programming signal (80);

a first gateway storage device (290) for storing the storable representation of the first gateway output signal (60);

at least one first gateway transmitter (260) for transmitting a gateway output signal selected from the group of gateway output signals consisting of the first gateway output signal (60) and the second gateway output signal (61), for transmitting a nodal output signal message received signal selected from the group of nodal output signal message received signals consisting of the first nodal output signal message received signal (50) and the second nodal output signal message received signal (51), for transmitting a second gateway output message signal received signal (71), and for transmitting the control center programming signal (80);

(d) the at least second gateway (201) further comprises;

at least one second gateway power source (241);

at least one second gateway receiver (251) for receiving an output signal selected from the group of output signals consisting of the first nodal output signal (40) and the second nodal output signal (41), for receiving the first gateway output signal (60), for receiving a second gateway output signal message received signal (71), and for receiving the control center programming signal (80);

at least one second gateway programmable gateway processor (281) for processing the output signal selected from the group of output signals consisting of the first nodal output signal (40) and the second nodal output signal (41) to create the second gateway output signal (61) and creating a storable representation of the second gateway output electrical signal (61), for generating a nodal output signal message received signal selected from the group of nodal output signal message received signals consisting of the first nodal output signal message received signal (50) and the second nodal output signal message received signal (51), for processing the first gateway output signal (60) and generating the first gateway output signal message received signal (70), and for processing the control center programming signal (80);

a second gateway storage device (291) for storing the storable representation of the second gateway output signal;

at least one second gateway transmitter (261) for transmitting a gateway output signal selected from the group of gateway output signals consisting of the first gateway output signal (60) and the second gateway output signal (61), for transmitting a nodal output signal message received signal selected from the group of nodal output signal message received signals consisting of the first nodal output signal message received signal (50) and the second nodal output signal message received signal (51), for transmitting the first gateway output signal message received signal (70), and for transmitting the control center programming signal (80); and (e) the control center (300) further comprises;
  at least one control center power source (340);
  at least one control center receiver (350) for receiving the first gateway output signal (60) and the second gateway output signal (70);
  at least one programmable control center processor (380) for processing the first gateway output signal (60) and the second gateway output signal (70) and for creating a storable representation of the first gateway output signal (60) and the second gateway output signal (70), for creating a humanly perceptible representation of the first gateway output signal (62) and a humanly perceptible representation of the second gateway output signal (63), for generating the first gateway output signal message received signal (70), for generating the second gateway output signal message received signal (71), and for processing the control center programming signal (80);
  at least one control center storage device (390) for storing a digital representation of the first gateway output signal (60) and the second gateway output signal (61);
  at least one control center programming device (385) for creating the control center programming signal (80) and for remotely programming the first nodal programmable processor (180), the second nodal programmable processor (181), the first gateway programmable processor (280), and the second gateway programmable processor (281);
  at least one control center transmitter (360) for transmitting the first gateway output signal message received signal (70), the second gateway output signal message received signal (71), and the control center programming signal; and
  at least one display device (400) for displaying the humanly perceptible representation of the first gateway output signal (62) and the humanly perceptible representation of the second gateway output signal (63).

2. The system of claim 1, wherein at least one of the at least one nodes (100, 101) further comprises a first nodal GPS device (130) in communication with the nodal processor (180) to generate a GPS coordinate signal (99), and the GPS coordinate signal (99) is transmittable by at least one of the at least one nodal transmitters (160, 161).

3. The system of claim 1, wherein the first nodal first environmental condition (12) is humidity.

4. The system of claim 1, wherein the first nodal second environmental condition is temperature (14).

5. The system of claim 1, wherein the first nodal power source (140) is at least one solar panel (246).

6. The system of claim 1, wherein the first nodal power source (140) is at least one battery (244).

7. The system of claim 1, wherein the control center programming device (385) is in communication with the control center (300) through the internet.

8. The system of claim 1, wherein the display (400) further includes at least one remote display device (410) remote from the control center (300).

9. The system of claim 7, wherein the remote display device (410) is in communication with the control center (300) via the internet.

10. A method for detecting and monitoring environment conditions comprising the steps of:
  (a) positioning at least a first node (100) in an area to be monitored;
  (b) positioning at least a second node (101) in the area to be monitored;
  (c) positioning at least a first gateway (200) in radio communication with the at least first node (100);
  (d) positioning a control center (300) in radio communication with the at least one gateway (200);
  (e) generating at least one environmental signal (20, 21) from a sensor selected from the group of sensors consisting of a first and second nodal sensor (110, 120) of the at least one node (100);
  (f) processing in a first nodal programmable processor (180) the at least one environmental signal (20, 21) to generate a first nodal output signal (40);
  (g) making a nodal output signal (40) disposition on the basis of predetermined criteria to make a disposition selected from the group of dispositions consisting of immediate transmission of the first nodal output signal (40) and deferred transmission of the first nodal output signal (40);
  (h) effecting storage in a first nodal storage device (190) of a digital representation of the first nodal output signals (40) reflective of dispositions for deferred transmission;
  (i) effecting periodic transmission by a first nodal transmitter (160) on a predetermined schedule of a digital representation of the first nodal output signals (40) reflective of dispositions for deferred transmission to at least one receiving site selected from the sites consisting of at least a second node (120) and the at least first gateway (200) along a predetermined transmission pattern;
  (j) effecting immediate transmission by the nodal transmitter (160) of a digital representation of the first nodal output signal (40) reflective of disposition for immediate transmission to at least one receiving site selected from the sites consisting of at least the second node (120) and the at least first gateway (200) along a predetermined transmission pattern;
  (k) generating a first nodal output signal message received signal (50) in the at least one receiving site and transmitting it for receipt to the at least one first node (100);
  (l) repeating steps (i) through (k) by a series of alternate transmission steps selected from the group of steps consisting of higher powered transmissions and a predetermined hierarchy of predetermined transmission patterns for a predetermined period of time until the receiving site of step (j) above is the at least one first gateway (200) and the first nodal output signal message received signal (50) is generated and transmitted to the at least one first node (100), and the first nodal output signal message received signal (50) is received by the at least one first node (100);
  (m) processing the first nodal output signal (40) in the gateway processor to create a first gateway output signal (60);
  (n) making a disposition on the basis of predetermined criteria to make a disposition selected from the group of dispositions consisting of immediate transmission of the first gateway output signal (60) and deferred transmission of the first gateway output signal (60);
  (o) effecting storage in a gateway storage device (290) of a digital representation of the first gateway output signal (60) reflective of dispositions for deferred transmission;
  (p) effecting periodic transmission by a gateway transmitter (260) on a predetermined schedule of a digital representation of the first gateway output signal (60) reflective of disposition for deferred transmission to at least one receiving site selected from the sites consisting of at least a second gateway (201) and the control center (300) along a predetermined transmission pattern;

(q) effecting immediate transmission by the gateway transmitter (260) of a digital representation of the first gateway output signal (60) reflective of disposition for immediate transmission to at least one receiving site selected from the sites consisting of at least the second gateway (201) and the control center (300) along a predetermined transmission pattern;

(r) generating a first gateway output signal received signal (71) in the at least one receiving site and transmitting it for receipt to the at least one first gateway (200);

(s) repeating steps (p) through (r) by a series of alternate transmission steps selected from the group of steps consisting of higher powered transmissions and a predetermined hierarchy of predetermined transmission patterns until the receiving site of step (q) above is the control center (300) and the first gateway output signal received message (70) is received by the at least one gateway (200); and (t) further processing the first gateway output signal (60) to create a humanly perceptible representation of the first gateway output signal (70).

11. The method of claim 10, further comprising the step of remotely altering the programming of one of the processors selected from the group of processors consisting of the at least one nodal processor (180) and at least one gateway processor (280) from the control center (300).

12. The method of claim 10, further comprising the step of transmitting the humanly perceptible representation of the first gateway output signal (70) to a plurality of distance sites.

13. The method of claim 10, further comprising generating and storing a digital representation of the first gateway output signal (70) in a control center storage device (390).

14. The method of claim 10, wherein the receipt of the first nodal output signal received signal (50) by the at least first node (100) in step (l) creates a first nodal transmission stop signal (90) that stops further transmission until there is a change in at least one predetermined parameter of the first nodal output signal (40).

15. The method of claim 10, wherein the receipt of the first gateway output signal message received signal (70) by the at least first gateway (200) in step (s) creates a first gateway transmission stop signal (92) that stops further transmission by the first gateway transmitter (260) until there is a change in at least one predetermined parameter of the first gateway output signal (60).

16. The method of claim 10, further comprising the step of altering the programming of a programmable processor selected from the group of programmable processors consisting of the at least first nodal programmable processor (180) and the at least one first gateway programmable processor (280) by means of a signal transmitted by the control center transmitter (360).

17. The method of claim 10, further comprising the step of geographically mapping the relative location of the at least first node (100) and the at least second node (101).

18. The method of claim 17, wherein the step of geographically mapping the relative location of the at least first node (100) and the at least second node (101) further comprises the steps of;

(a) determining an absolute geographic position of the at least first node (100) by GPS;

(b) determining an absolute geographic position of the at least second node (101) by GPS;

(c) reporting the absolute geographic position of the at least first node (100) and at least second node (101) to the control center programmable processor (380) by means of at least one transmitted GPS location signal;

(d) mapping the absolute positions of the at least first node (100) and at least second node (101) by the control center (300) to determine the relative positions of the at least first node (100) and the at least second node (101), by the control center (300); and (e) determining the predetermined transmission patterns of steps (l) and (q) at least in part on the basis of the relative positions of the at least first node (100) and at least second node (101).

* * * * *